United States Patent
Iwasa

[19]

[11] Patent Number: 5,477,259
[45] Date of Patent: Dec. 19, 1995

[54] MULTIPLE BEAM SCANNING APPARATUS, LIGHT SOURCE UNIT, AND METHOD OF MANUFACTURING THE SAME

[75] Inventor: Hiroshi Iwasa, Kyoto, Japan

[73] Assignee: Dainippon Screen Mfg. Co., Ltd., Japan

[21] Appl. No.: 96,958

[22] Filed: Jul. 26, 1993

[30] Foreign Application Priority Data

Jul. 29, 1992 [JP] Japan ................................ 4-223403

[51] Int. Cl.$^6$ ..................................................... B41J 2/45
[52] U.S. Cl. ...........:.............................. 347/238; 347/233
[58] Field of Search .................................. 347/115, 116, 347/117, 132, 133, 232, 233, 238, 240, 241, 256

[56] References Cited

U.S. PATENT DOCUMENTS 4,541,712  9/1985  Whitney .................................. 359/310
4,796,964  1/1989  Connell et al. ......................... 347/238
5,146,242  9/1992  Zielinski ................................ 347/238

FOREIGN PATENT DOCUMENTS 5438130  3/1979  Japan .

*Primary Examiner*—Mark J. Reinhart
*Attorney, Agent, or Firm*—Ostrolenk, Faber, Gerb & Soffen

[57] ABSTRACT

Disclosed herein is a light source unit for emitting multiple beams, which can be reduced in size. The light source unit (10) is formed by a base block (5) and ten stays (3). Ten locating pins (6) are provided on each side of the base block (5) at a second space (d) in a direction Y' and a third space (l) in a direction X'. Eight holes (7) are provided in each stay (3) at a first space (D), while holes (8) for locating pins (6) are provided on both ends thereof. A semiconductor laser is arranged in each hole (7). Each of the locating pins (6) is inserted into one individual one of the pin holes (8) and the ten stays (3) are then fixed to the base block (5) by through bolts (17). Thus, eight times ten semiconductor lasers are arranged on a two-dimensional plane of X'-Y' coordinates.

23 Claims, 11 Drawing Sheets

$D = m \cdot d$, $\ell = k \cdot d$

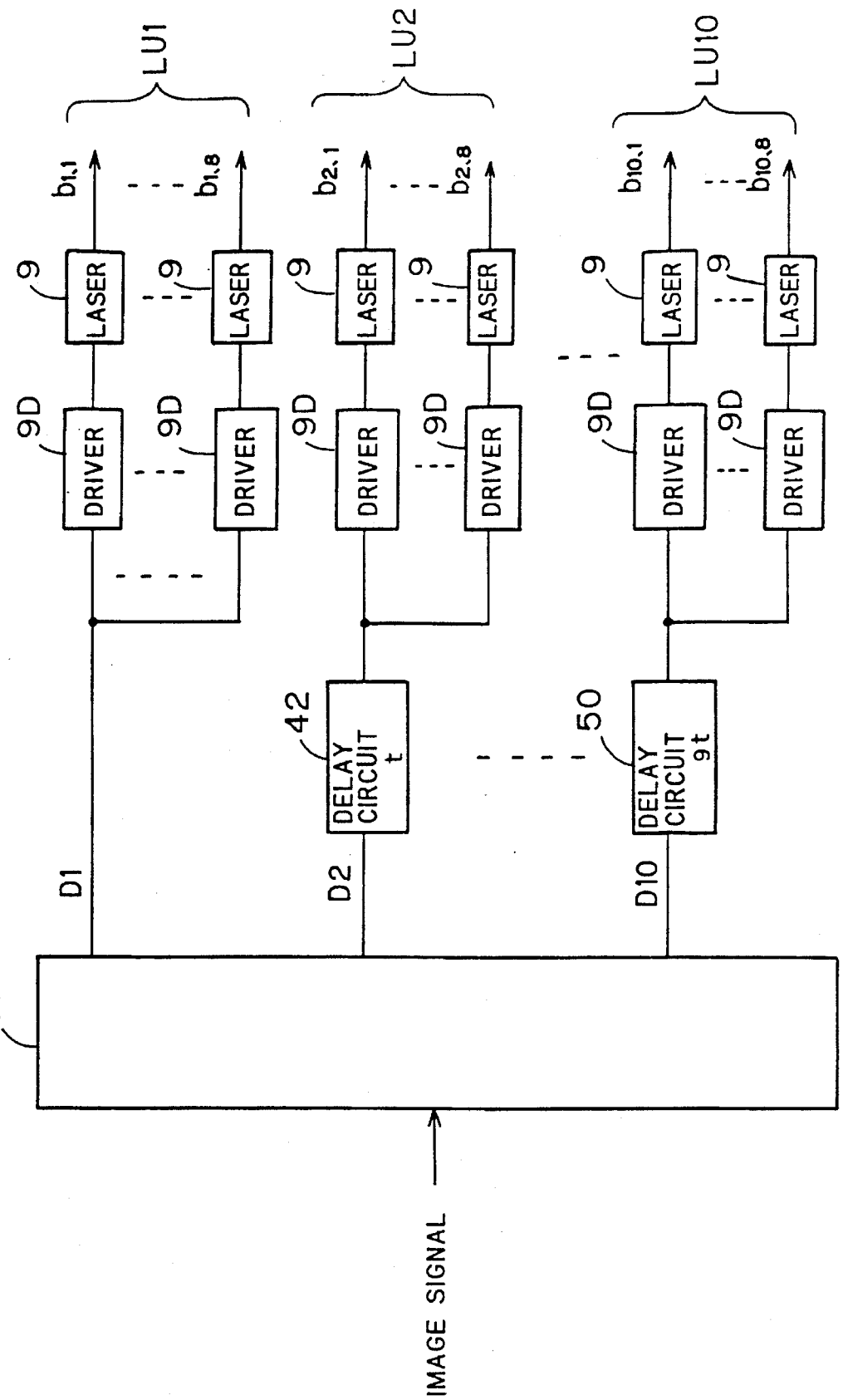

MULTIPLE BEAM SCANNING APPARATUS, LIGHT SOURCE UNIT, AND METHOD OF MANUFACTURING THE SAME

BACKGROUND OF THE INVENTION

1. Field of the Invention

The present invention relates to the structure of a light source unit which is employed in a multiple beam scanning recorder.

2. Description of the Background Art

In an image scanning recorder such as a color scanner, multiple beams which are modulated by recording signals are scanned simultaneously on a recording medium in order to improve a recording speed. At this time, the multiple beams are implemented by arranging a plurality of light emitting devices such as laser diodes or light emitting diodes along a constant direction.

FIGS. 12(a) and 12(b) illustrate arrangements of such light emitting devices. Referring to FIG. 12, an arrangement of beams $b_1$ to $b_5$ shown at (a) is attained when five light emitting devices are arranged in a subscanning direction Y at regular intervals A. This arrangement is simple and widely applied in the art.

On the other hand, an arrangement shown at (b) in FIG. 12 is attained by improving the arrangement (a), in order to further reduce the beam-to-beam intervals. Namely, five light emitting devices (five beams $b_1$ to $b_5$) are arranged at regular intervals A' (< A) in a direction inclined by an angle θ with respect to a main scanning direction X.

U.S. Pat. No. 4,253,102 discloses a beam arrangement which is similar to the arrangement (b). According to this technique, respective light emitting devices are arranged on a straight line, which is inclined by an angle θ with respect to a subscanning direction, at regular intervals. This technique is aimed at arranging beams so that no clearances are defined between the respective beam spots when the beams are scanned in the main scanning direction. In this technique, therefore, it is necessary to arrange the light emitting devices so that adjacent ones of the light emitting devices or the beams are necessarily in contact with each other, as well as to expose a photosensitive film while finally maintaining the state of the beam arrangement which is inclined by the angle 0 with respect to the subscanning direction. Due to such characteristics, this technique attains its specific object.

The aforementioned technique can be regarded as useful when the number of the beams is relatively small. When the number of the beams is increased to more than ten due to requirement for further improvement of the recording speed, however, a light source part is increased in dimension in proportion to the number of beams in the beam arrangement according to this technique, leading to such a problem that this part cannot practically serve as a light source for a scanning recorder. In a general scanning recorder, beam-to-beam intervals between multiple beams which are emitted from a light source part are reduced to prescribed values through a reduction optical system so that the reduced beams are scanned on an exposed film. Therefore, the light source part is naturally limited in size in response to the size of an employable reduction optical system (lenses).

Thus, awaited is implementation of a light source part (or a light source unit) which is also applicable to a multi-channel type scanning recorder employing 80 beams, for example.

SUMMARY OF THE INVENTION

The present invention has been proposed in order to satisfy the aforementioned requirement, and an object thereof is to implement a light source unit being applied to a multiple beam scanning recorder, which can be reduced in size even if the number of beams is increased. The present invention provides a light source unit which has excellent flexibility with a simple structure. The present invention simplifies greatly assembling of the light source unit with high accuracy and high precision.

According to the present invention, a multiple beam scanning apparatus comprises (a) a recording medium, (b) means for generating m by n (m, n: integers of at least 2) recording information signals, (c) means for emitting m by n optical beams which are independently modulated in response to the recording information signals respectively. The m by n optical beams are so arranged in a plane being perpendicular to the travelling direction thereof that m optical beam groups, each including n optical beams which are arranged in a second direction being perpendicular to a first direction at intervals of a first space, are arranged at regular intervals in the first direction and shifted at intervals of a second space with respect to the second direction. The first space corresponds to m times the second space. The multiple beam scanning apparatus further comprises (d) means for reducing a beam-to-beam pitch of the aforementioned m by n optical beams which are received from the means (c) and focusing the reduced m by n optical beams on the recording medium. The beam-to-beam pitch corresponds to a center to center distance between adjacent ones of the m by n optical beams. The multiple beam scanning apparatus further comprises (e) means for scanning the m by n optical beams, which are imaged on the recording medium, in the first direction.

The present invention is also directed to a light source unit which is employed for recording information on the basis of optical beams being modulated in response to recording information signals. According to the present invention, the light source unit comprises (a) a base, and (b) m (m: integer of at least 2) line units each having n (n: integer of at least 2) light emitting devices which are arranged in a first direction at intervals of a first space. The first direction is parallel to the longitudinal direction of the line units and the m line units are arranged in parallel on the base at intervals of a third space in a second direction, which is perpendicular to the first direction, to be successively shifted by intervals of a second space in the first direction, while the first space is decided as a function of the second space.

The present invention is further directed to a method of manufacturing a light source unit which is employed for recording information on the basis of optical beams being modulated in response to recording information signals. According to the present invention, the method comprises (a) a step of preparing m line units each including a first portion, a second portion, and a third portion, which is held between the first and second portions. The first and second portions have first and second mounting portions respectively. The method further includes (b) a step of mounting n light emitting devices on the third portion along a first direction at intervals of a first space in an aligned manner successively from a reference position. The method further includes (c) a step of preparing a base having first and second end portions each having m (m: integer of at least 2) first and second support portions which are successively arranged at intervals of a second space in the first direction and a third space in a second direction, being perpendicular to the first direction. The second space corresponds to a value obtained by dividing the first space by m and the third space is selected as a function of the second space. The method further includes (d) a step of engaging the first and second mounting portions of each line unit with corresponding ones of the first and second support portions, thereby fixing each of the line units to the base.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 11 is a block diagram schematically showing an electric system for driving respective semiconductor lasers in the light source unit.

DESCRIPTION OF THE PREFERRED EMBODIMENTS

A. Basic Structure of Light Source Unit (Arrangement of Light Emitting Devices)

Figure 1:
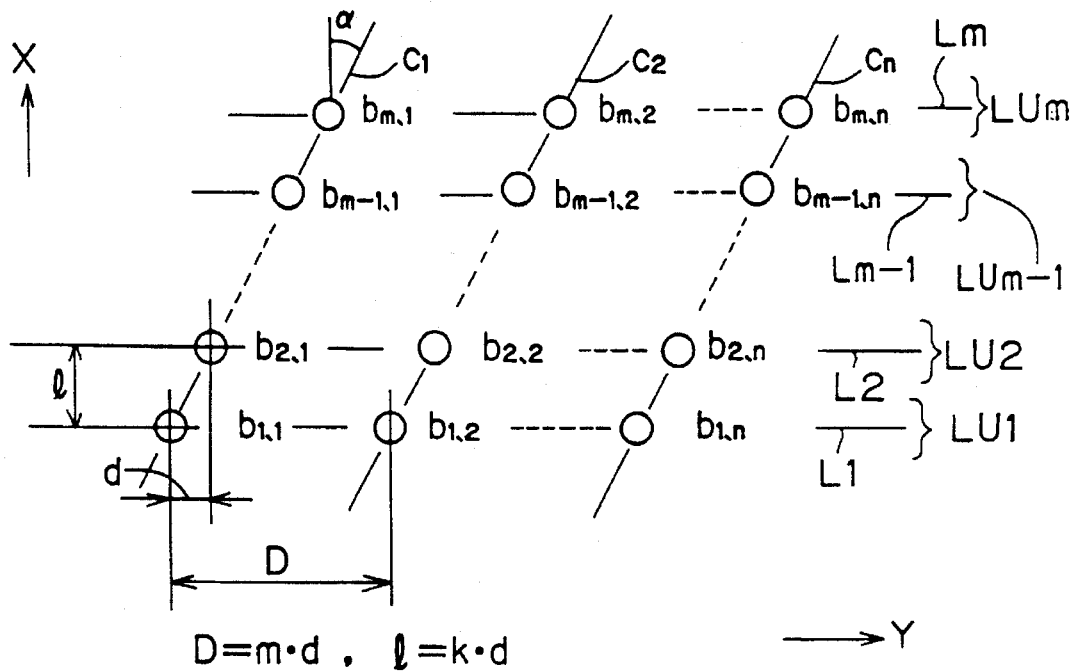
FIG. 1 is a diagram showing a basic structure of a light source unit according to the present invention.

FIG. 1 is a diagram showing a basic structure of a light source unit in a multiple beam scanning recorder according to the present invention. This figure shows positions of an arrangement of m by n beams which are emitted from m by n light emitting devices, such as semiconductor lasers or light emitting diodes, forming the light source unit as viewed from a beam travelling direction, i.e., positions of the arrangement of the m by n light emitting devices, where m and n represent integers of at least 2.

The m by n light emitting devices are arranged in positions on a two-dimensional plane, which is formed by X-Y coordinates along a main scanning direction X and a subscanning direction Y, in an arrangement similar to an m by n matrix.

As shown in FIG. 1, the m by n light emitting devices are formed by m line units LU1 to LUm. In each of the line units LU1 to LUm, n light emitting devices are arranged in the subscanning direction Y at regular intervals of a first space D. In the first line unit LU1, for example, n light emitting devices b11, b12, ..., b1n are arranged at regular intervals of the first space D. The remaining line units LU2 to LUm are identical in structure to this line unit LU1. The m line units LU1 to LUm are arranged at regular intervals (third space l) in the main scanning direction X to be successively displaced at intervals of a second space d in the subscanning direction Y. The second space d, which is related to a recording density (resolution) recorded on a recording medium, corresponds to a value obtained by dividing the first space D by the number m, i.e., satisfies relation of D= m·d. On the other hand, the third space l corresponds to a value obtained by multiplying the second space d by an integer k, i.e., l= k·d.

In other words, the aforementioned light emitting devices are arranged in the following manner: The light emitting devices are arranged on m by n intersections between m straight lines L1, L2, ..., Lm, which are drawn in parallel with the subscanning direction Y at regular intervals of the third space l in the main scanning direction X, and n straight lines C1, C2, ..., Cn, which are inclined at an angle $\alpha$ with respect to the main scanning direction X and drawn at regular intervals of the first space D in the subscanning direction Y. The angle $\alpha$ satisfies an equation of $\tan \alpha = D/(m \cdot l) = d/l$. Such light emitting devices b1p, b2p, ..., bmp, which are arranged on the respective straight lines Cp (p= 1, 2, ..., n), are arranged at regular intervals (the second space d) in the subscanning direction Y and at regular intervals (third space l) in the main scanning direction X.

Figure 2:
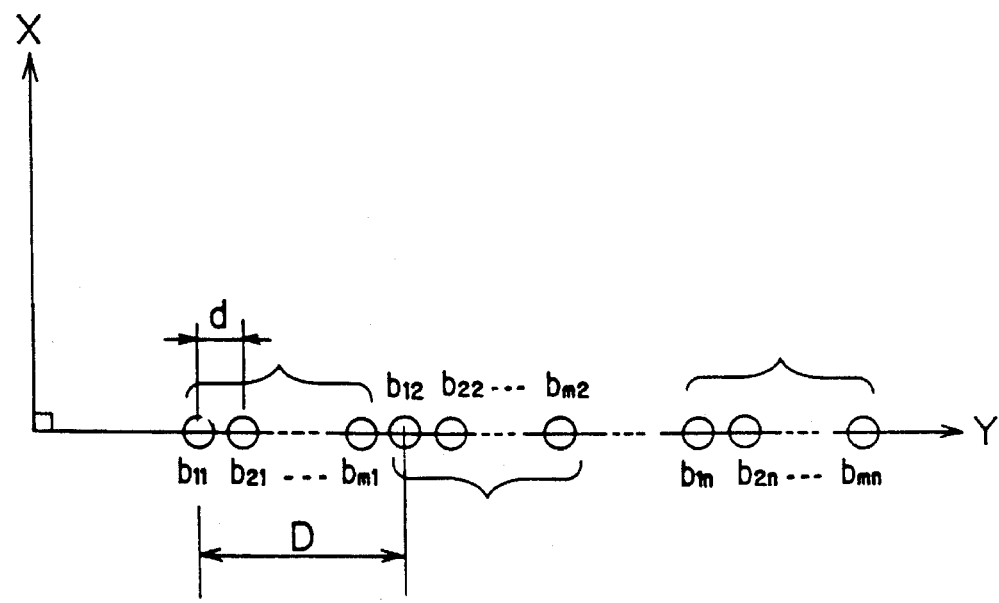
FIG. 2 is a diagram showing a beam arrangement in exposure.

FIG. 2 illustrates the light emitting devices, which are two-dimensionally arranged in FIG. 1, in a state one-dimensionally projected on the subscanning direction Y. Referring to FIG. 2, m by n light emitting devices are arranged at regular intervals (the second space d) successively from the light emitting device b11 which belongs to the line unit LU1. It is possible to scan m by n beams in single main scanning by employing the m by n light emitting devices which are arranged in the aforementioned manner.

In order to scan/expose m by n beams on a photosensitive film (recording medium) with the light source unit which is provided with the light emitting devices shown in FIG. 1, however, it is necessary to align the m by n light emitting devices on the photosensitive film. This can be implemented by relatively delaying timing for driving the light emitting devices between each adjacent line units.

B. Concrete Structure of Light Source Unit

Figure 3:
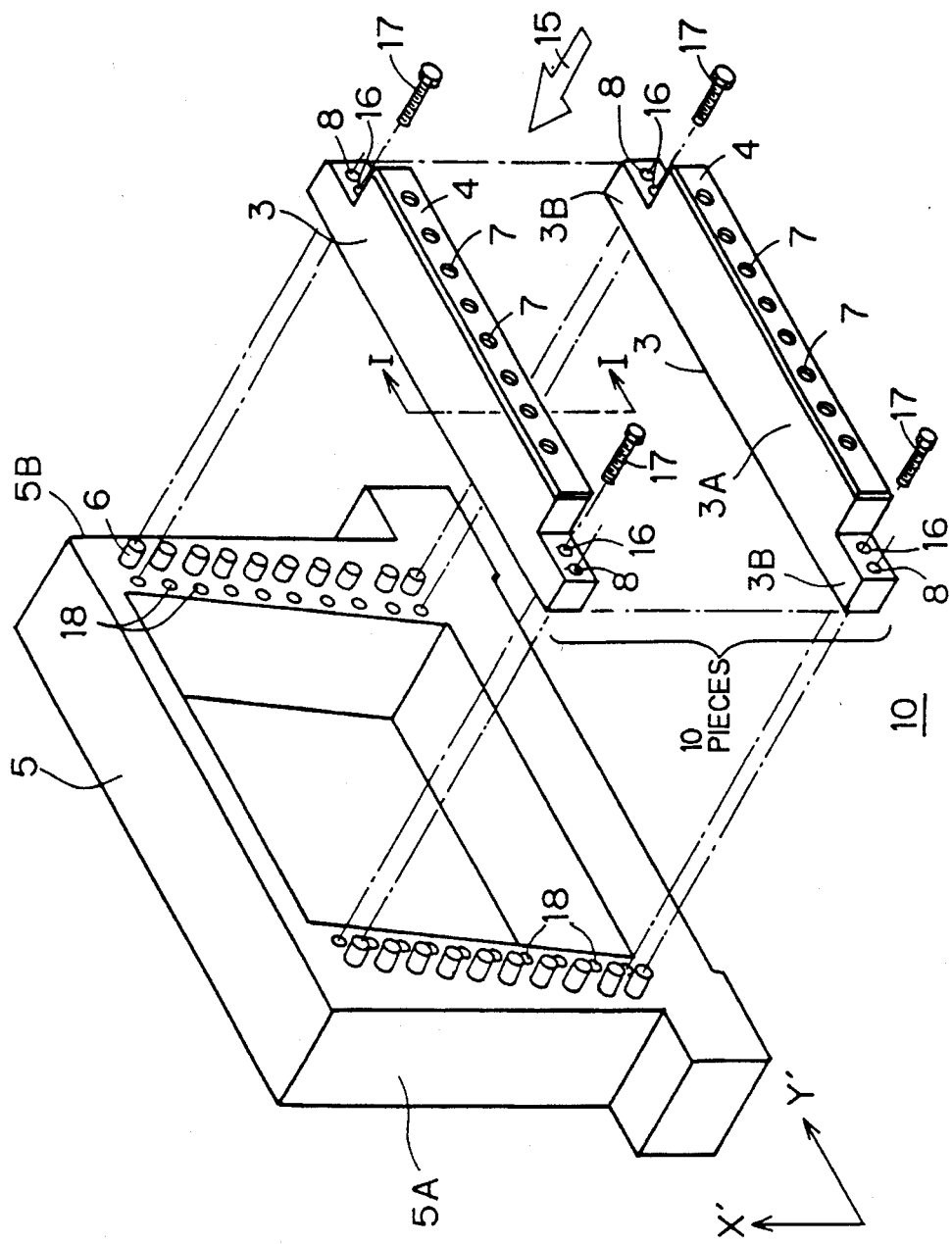
FIG. 3 is a perspective view showing a light source unit according to an embodiment of the present invention.

Description is now made on a concrete structure which can implement the aforementioned basic structure of the light source unit. FIG. 3 is a perspective view showing an embodiment of such a light source unit 10, in correspondence to m= 10 and n= 8. As shown in FIG. 3, this light source unit 10 is formed by a base block 5 and ten stays 3. The stays 3 correspond to the aforementioned line units LUi (i: 1 to m). The structures of the stays 3 and the base block 5 are now described in detail.

(1) Structure of Stay 3

Figure 5:
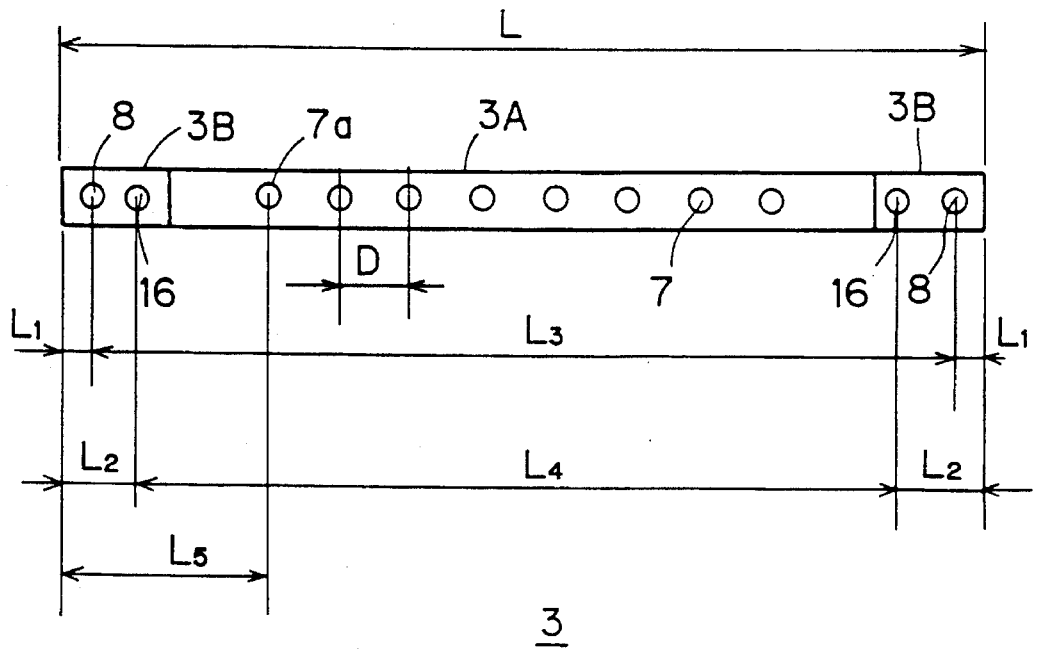
FIG. 5 is a front elevational view showing the structure of the stay.

FIG. 5 is a front elevational view showing each stay 3 as viewed by looking in the direction of arrow 15 in FIG. 3. As shown in FIGS. 3 and 5, each stay 3 has the following structure:

First, pin holes 8 and bolt holes 16 are formed on both side portions 3B of the stay 3 respectively. The stay 3 has a longitudinal length L, while centers of the pin holes 8 and the bolt holes 16 are separated from ends of the stay 3 by distances $L_1$ and $L_2$ respectively. Further, the pin holes 8 and the bolt holes 16 are at center distances $L_3$ and $L_4$ respectively. The pin holes 8 are adapted to receive locating pins 6 (FIG. 6) as described later for locating the stay 3 on the base block 5, while the bolt holes 16 are adapted to receive bolts 17 as described later for fixing the as-located stay 3 to the base block 5. In a stepped or projecting portion 3A of the stay 3, on the other hand, eight holes 7 are formed at regular intervals of the first space D. Light emitting devices such as semiconductor lasers are arranged in the respective holes 7, as hereinafter described. Referring to FIG. 5, the center of the leftmost hole 7a is in a position separated from the left end by a distance $L_5$.

An aperture board 4, which is provided with apertures holes corresponding to the holes 7, is mounted on a surface of the projecting portion 3A of the stay 3.

Figure 4:
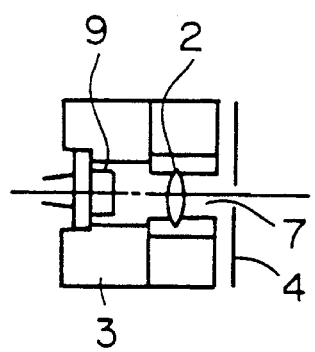
FIG. 4 is a sectional view showing an arrangement of a semiconductor laser in a stay which is employed for the light source unit.

FIG. 4 is a sectional view, showing the projecting portion 3A of the stay 3, taken along the line I—I shown in FIG. 3. As shown in FIG. 4, a semiconductor laser 9 and a collimator lens 2 are arranged in each hole 7 of the stay 3. The collimator lens 2 is adapted to shape a laser beam which is emitted from the semiconductor laser 9. Thus, the semiconductor laser 9 and the collimator lens 2 are arranged in each hole 7.

A driving circuit for the semiconductor lasers 9 etc. is provided in the exterior of the light source unit 10, as described later.

(2) Structure of Base Block 6

Figure 6:
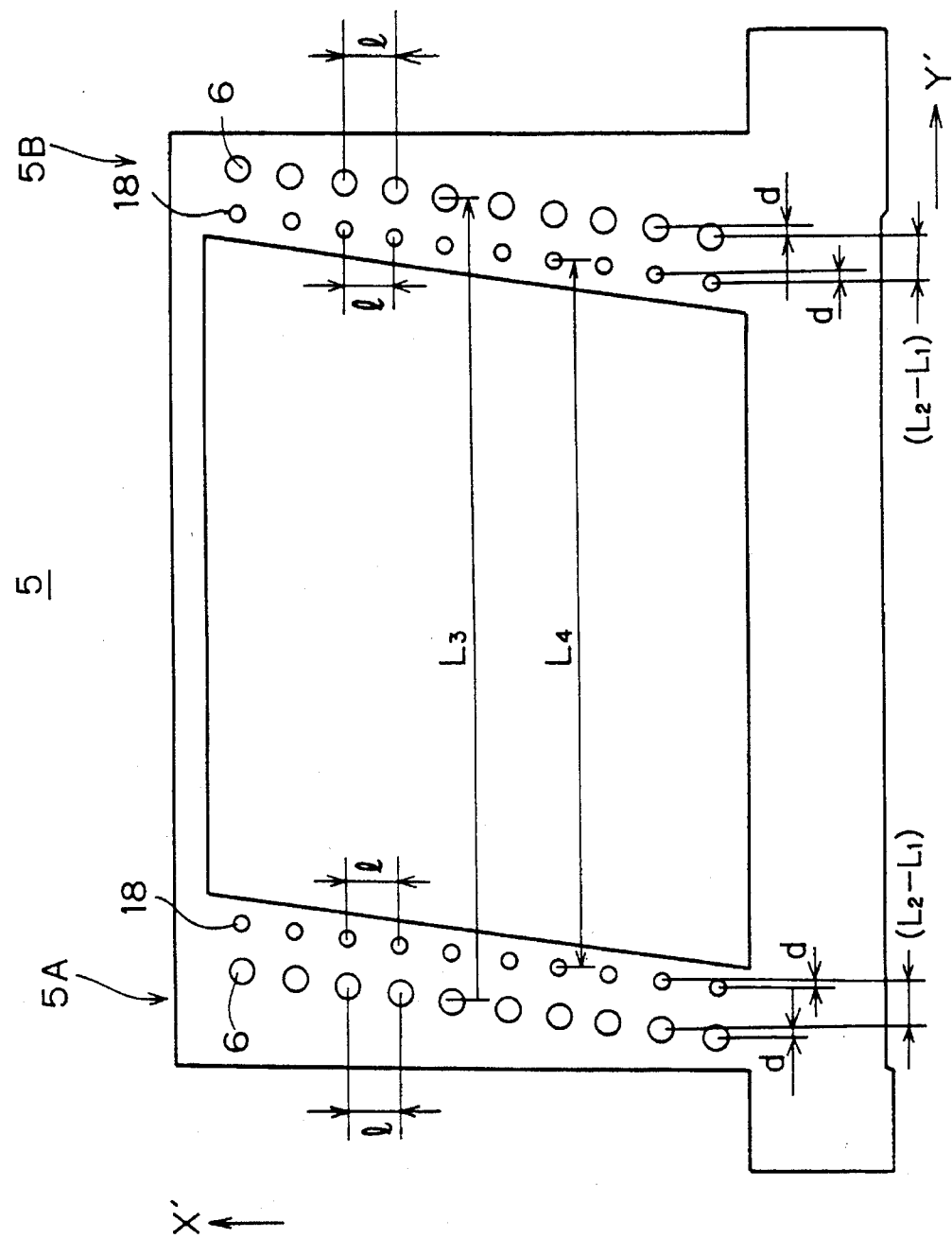
FIG. 6 is a front elevational view showing a base block which is applied to the light source unit.

FIG. 6 is a front elevational view, showing the base block 5, as viewed by looking in the direction of arrow 15 in FIG. 3. As shown in FIG. 6, the stages of locating pins 6 and ten stages of tapped holes 18 are aligned on each side of the base block 5. Further, both the locating pins 6 and the tapped holes 18 are arranged at intervals of the second space d in a direction Y' and of the third space e in a direction X'. The locating pins 6 and the tapped holes 18 provided on both sides of the base block 5 are at center to center distances $L_3$ and $L_4$ respectively. Adjacent ones of the locating pins 6 and the holes 18 are separated from each other by a distance $(L_2-L_1)$. The directions Y' and X' correspond to the aforementioned subscanning and main scanning directions Y and X respectively. Thus, the ten stages of locating pins 6 are arranged along a straight line which is in parallel with the respective straight lines C1 to Cn shown in FIG. 1.

C. Procedure for Manufacturing/Assembling Light Source Unit

Figure 7A:
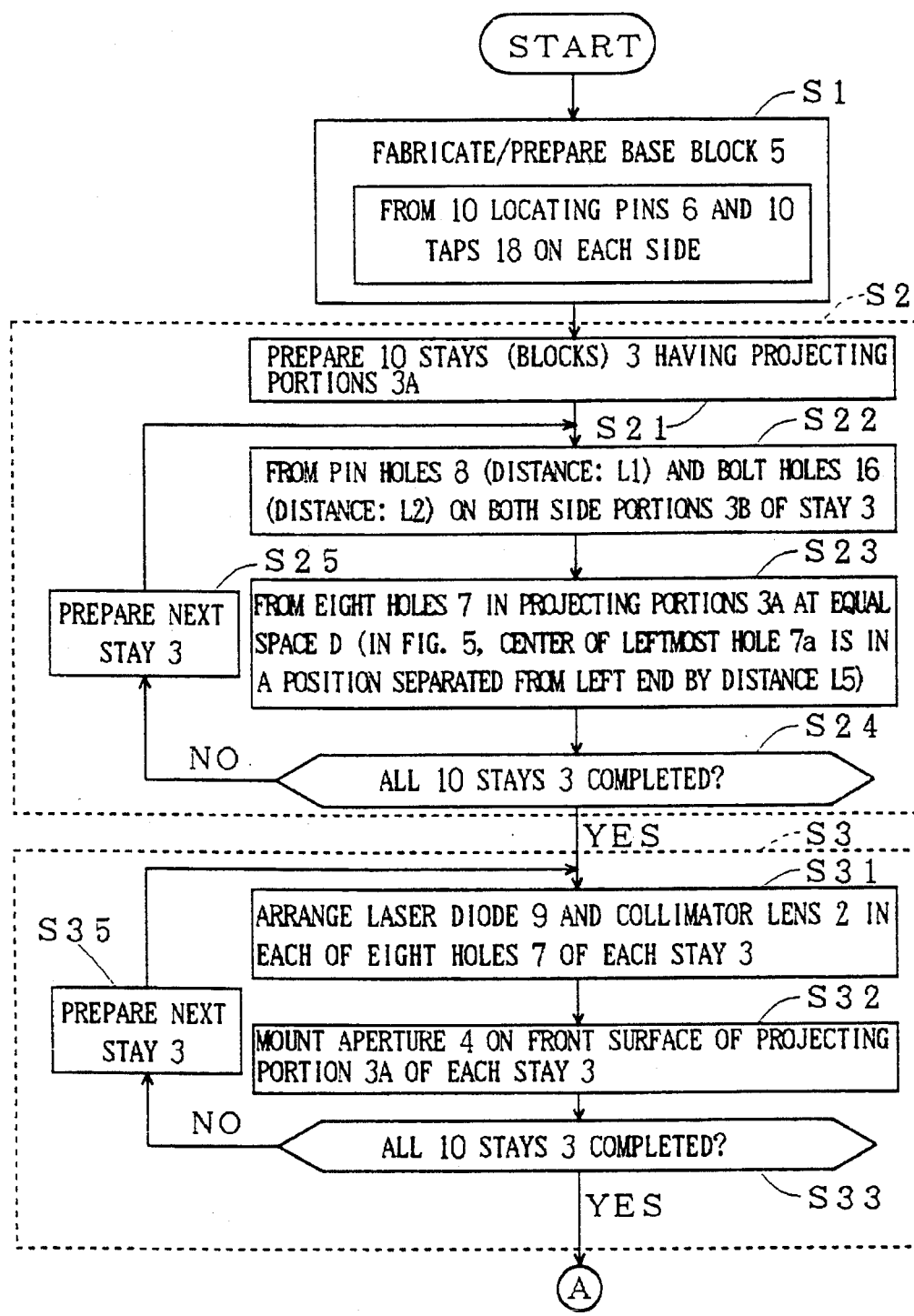
FIGS. 7A and 7B are flow charts showing a procedure of assembling the light source unit.
Figure 7B:
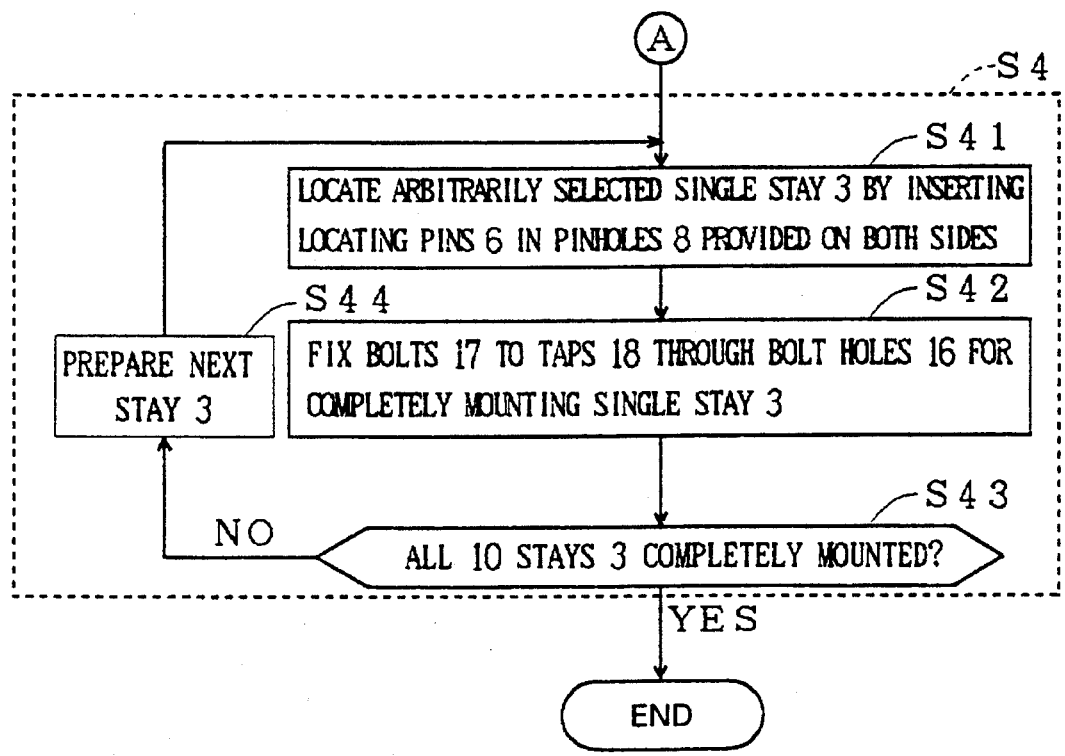

A method of manufacturing/assembling the light source unit is understood on the basis of FIG. 3 as described above and flow charts shown in FIGS. 7A and 7B. This method is generally formed by a step S1 of fabricating (preparing) the base block 5, steps S2 and S3 of fabricating (preparing) the stays 3, and a step S4 of mounting the stays 3 on the base block 5.

(1) Step S1

First, the base block 5 is fabricated in the shape shown in FIG. 6. Namely, ten locating pins 6 and ten taps 18 are formed along each of both side portions 5A and 5B of the base block 5. Adjacent ones of the locating pins 6 and those of the taps 18 are separated from each other by the third space in the direction X' and by the second space d in the direction Y', while adjacent ones of the locating pins 6 and the taps 18 are separated from each other by the distance $(L_2-L_1)$. Further, the center to center distances between the locating pins 6 provided on the portions 5A and 5B are set at the distance $L_3$. On the other hand, the center to center distances between the taps 18 provided on the portions 5A and 5B are set at the distance $L_4$.

(2) Steps S2 and S3

First, ten blocks for the stays 3 having projecting portions 3A are fabricated/prepared (step S21). Then, an arbitrary one is selected from the ten stays 3, to be worked in the following manner:

First, the pin holes 8 and the bolt holes 16 are formed on both end portions 3B of this stay 3 (step S22). Namely, the two pin holes 8 are so formed as to have center positions which are separated from the end surfaces of the both end portions 3B of the stay 3 by the distance $L_1$ respectively. The two bolt holes 16 are so formed as to have center positions which are separated from the end surfaces of the both end portions 3B by the distance $L_2$ respectively.

Then, eight holes 6 are formed in the projecting portion 3A at regular intervals equal to the first space D. These holes 7 are so formed that the center of the leftmost hole 7a appearing in FIG. 5 is separated from the left end surface by the distance $L_5$ (step S23).

When this stay 3 is completely lubricated through the steps S22 and S23, similar steps S22 and S23 are successively carried out on the remaining stays 3, to complete fabrication of the ten stays (steps S24 and S25).

At the step S3, the following steps S31 to S35 are carried out for each one of the ten stays 3. Namely, the semiconductor laser 9 and the collimator lens 2 are arranged in each of the eight holes 7 of each stay 3 (step S31), and the aperture board 4 is mounted on the front surface of the projecting portion 3A of the stay 3 (step S32). When the aforementioned assembling operation (steps S31 and S32) is completed, similar assembling operations are carried out on the remaining stays 3.

(3) Step S4

Then, the ten stays 3 are successively mounted on the base block 5. Namely, an arbitrary one is selected from the ten stays 3, to be subjected to a mounting operation of steps S41 and S42 as follows: First, the locating pins 6 are inserted in the pin holes 8 provided adjacent both ends of the stay 3, thereby locating the stay 3 (step S41). Then, the bolts 17 are inserted in the bolt holes 16, and fixed to the tapped holes 18. Thus, this stay 3 is completely mounted (step S42). The steps S41 and S42 are also carried out on the remaining stays 3, to complete the operation for mounting the ten stays 3 (steps S43 and S44). The respective holes 7 of each stay 3 are arranged as shown in FIG. 5, while the 10 stages of locating pins 6 are arranged on each side of the base block 5 as shown in FIG. 6, whereby an arrangement of beams (arrangement of semiconductor lasers) implemented by mounting the ten stays 3 on the base block 5 is identical to that shown in FIG. 1. In such assembling of the light source unit 10, further, the ten stays 3 can be easily mounted on the base block 5 since the stays 3 are absolutely identical in structure to each other.

Figure 8:
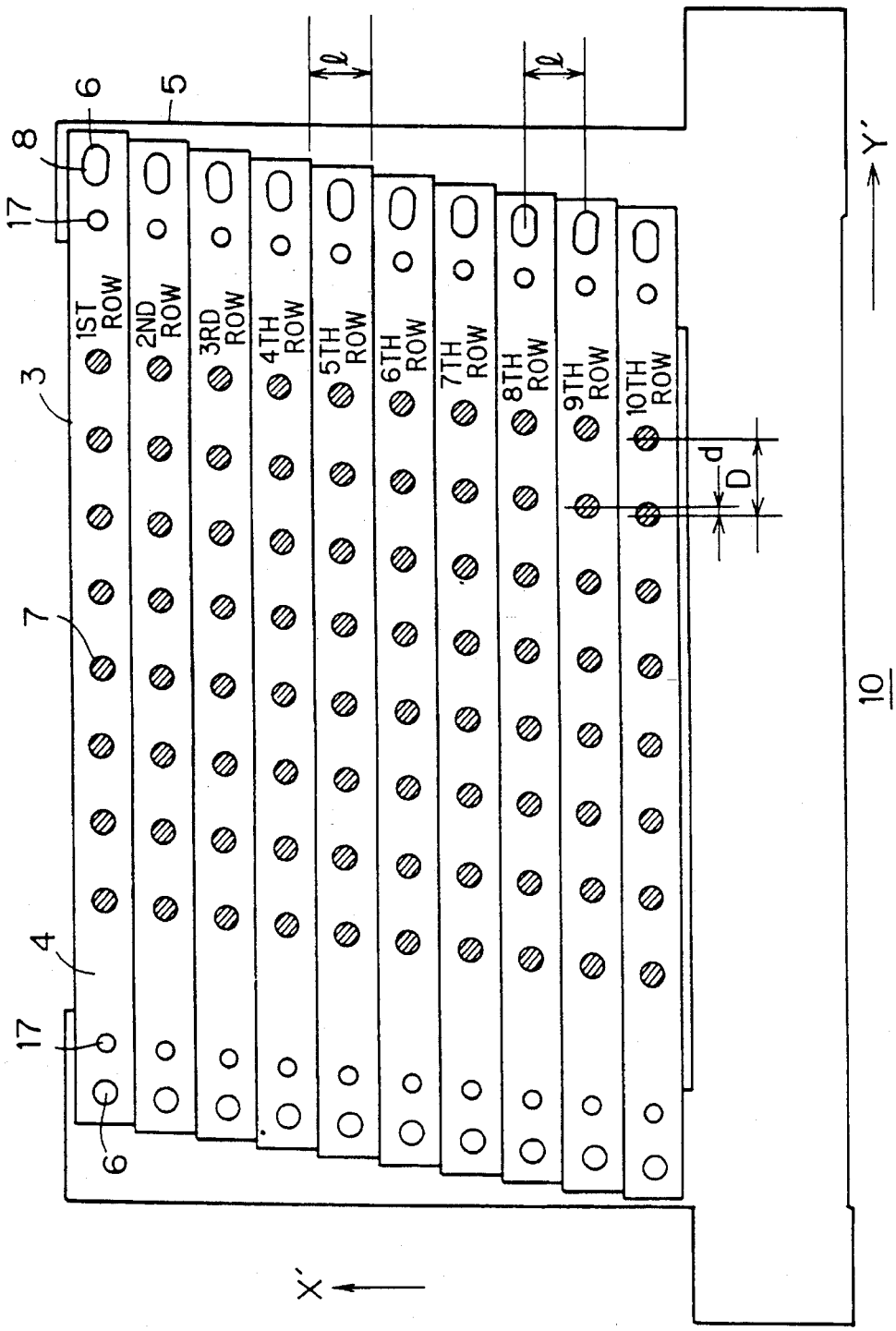
FIG. 8 is a front elevational view showing an assembled state of the light source unit.

FIG. 8 is a front elevational view, showing the as-assembled light source unit 10, as viewed by looking in the direction of arrow 15 in FIG. 3. Thus, it is possible to easily construct a light source unit having the beam arrangement shown in FIG. 1 by arbitrarily mounting the stays 3 on the base block 5 by the bolts 17 and the locating pins 6.

D. Optical Structure of Exposure Head

Figure 9:
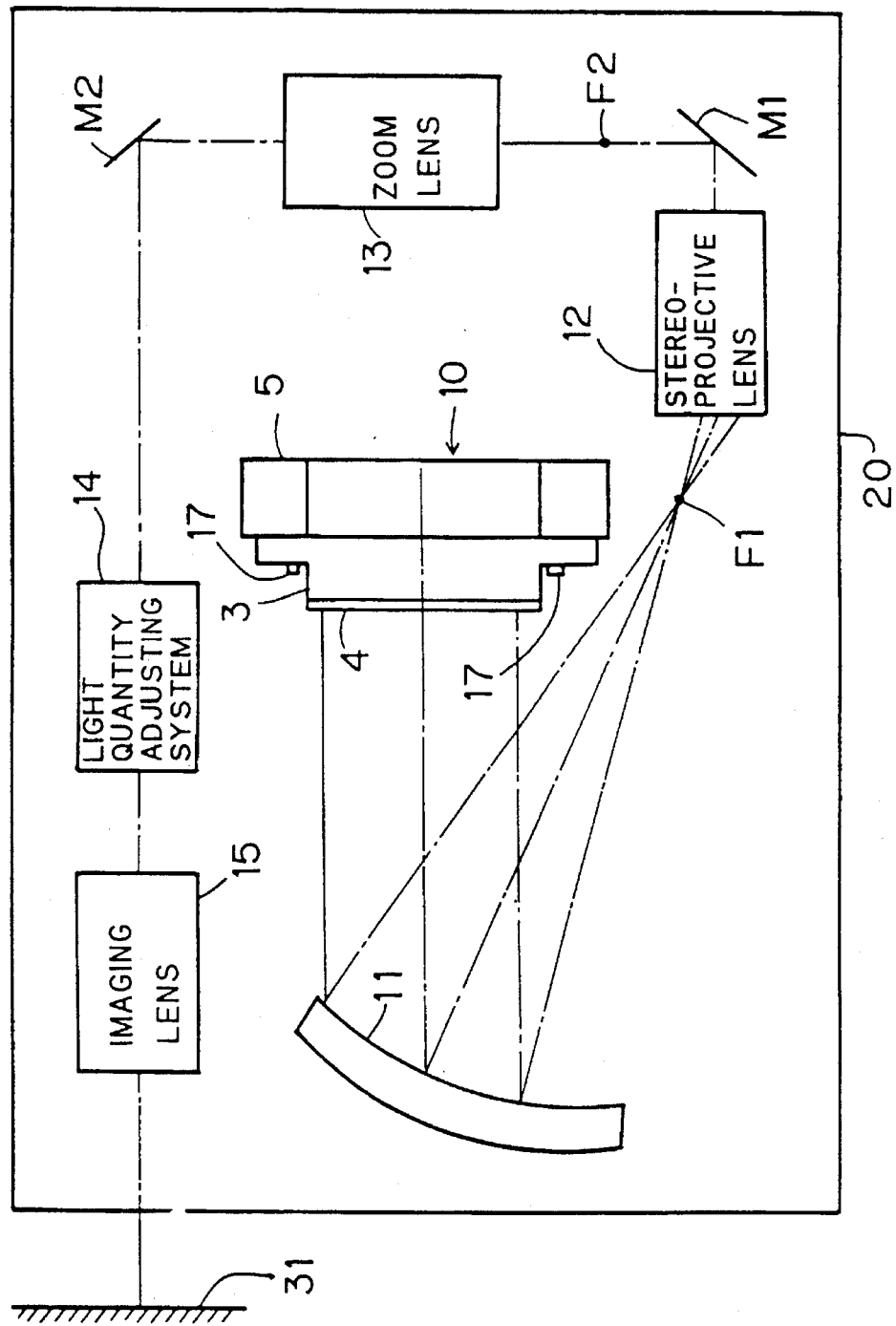
FIG. 9 is a plan view schematically showing the structure of an exposure head in which the light source unit is assembled.

FIG. 9 typically illustrates an optical structure of an exposure head 20 in which the light source unit 10 of this embodiment is assembled. The exposure head 20 is generally formed by the light source unit 10, a parabolic mirror 11 and a reduction optical system which is formed by a stereoprojective lens 12, a mirror M1, a zoom lens 13, another mirror M2, a light quantity adjusting system 14 and an imaging lens 15.

The m by n beams outgoing from the light source unit 10 are reflected by the parabolic mirror 11 so that all beams pass through a front focal point F1 of the stereoprojective lens 12, and guided to the stereoprojective lens 12. Therefore, an aerial image having a reduced beam-to-beam pitch is formed on a rear focal point F2 of the stereoprojective lens 12. The reduction rate is determined by focal lengths of the parabolic mirror 11 and the stereoprojective lens 12. Thereafter the beam-to-beam pitch is further reduced by the zoom 1.5 lens 13, the conversion magnification of which can be arbitrarily changed. The quantity of light which is finally applied to a photosensitive film 31 is adjusted by the light quantity adjusting system 14. This light quantity adjusting system 14 is formed by a circular ND filter (neutral density filter), the density of which continuously varies with the position of rotation. The beams adjusted in light quantity by the light quantity adjusting system 14 are imaged on the photosensitive film 31 by the imaging lens 15.

Thus, the beams outgoing from the light source unit 10 are subjected to reduction of the beam-to-beam pitch by the parabolic mirror 11 and the reduction optical system, to expose the photosensitive film 31. In order to change the beam-to-beam pitch on the photosensitive film 31, i.e., recording density (resolution) corresponding to an inversion number of the beam-to-beam pitch, the magnification of the zoom lens 13 may be changed.

E. Schematic Description of Image Scanning Recorder

Figure 10:
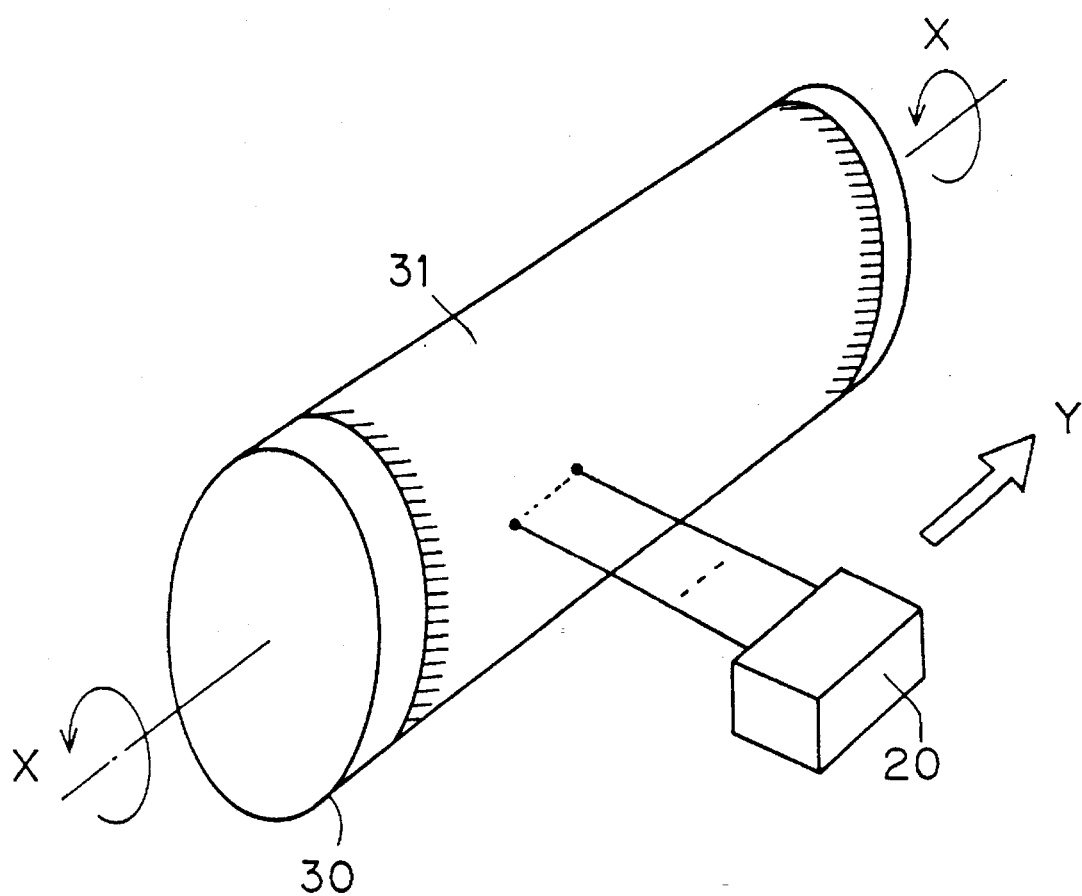
FIG. 10 is a schematic diagram showing the relation between a drum and the exposure head.
Figure 12A:
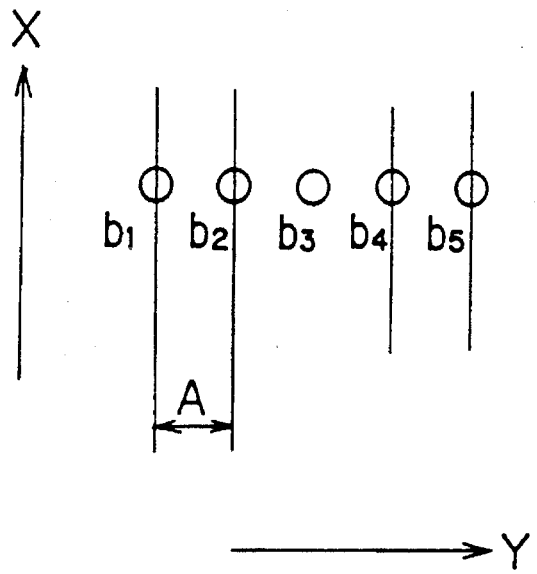
FIGS. 12(a) and 12(b) illustrate conventional beam arrangements in a conventional light source unit.
Figure 12B:
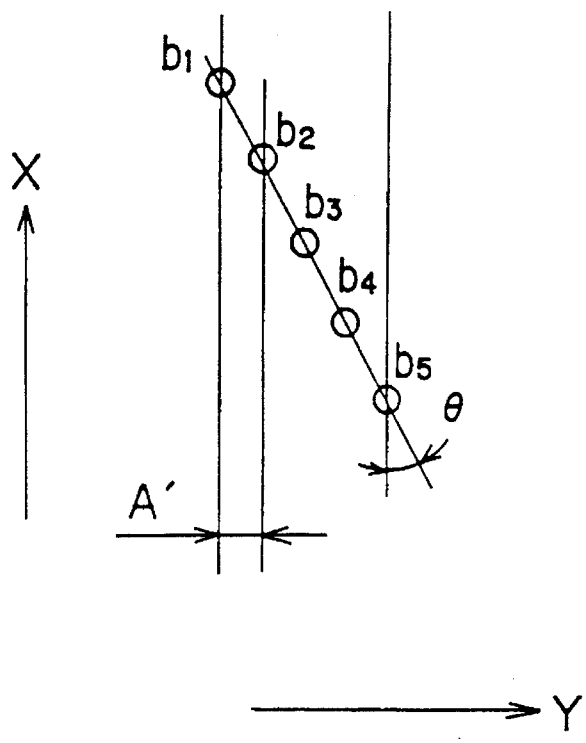

FIG. 10 shows positional relation between the exposure head 20 and the photosensitive film 31, for illustrating an actual exposure state. As shown in FIG. 10, the photosensitive film 31 is stuck onto the surface of a drum 30, which is rotated along the main scanning direction X about its central axis. On the other hand, the exposure head 20 is moved in the subscanning direction Y by a driving mechanism (not shown). When single exposure in the main scanning direction X is completed, therefore, the exposure head 20 is stepwise moved in the subscanning direction Y by a distance Is, to repeat the exposure in the main scanning direction X again. The distance Is satisfies the relation Is= n·D·MAG, where MAG is magnification of the reproduction optical system. At this time, the m by n beams which are applied onto the photosensitive film 31 must be aligned along the subscanning direction Y, as hereinabove described.

FIG. 11 is a block diagram showing an electrical structure of a driving part for 80 (m = 10, n = 8) semiconductor lasers 9. The driving part comprises halftone dot signal generating circuit 40, nine delay circuits 42–50, and 80 drivers. The halftone dot signal generating circuit 40 converts an image signal to ten binary dot signals D1 to D10 representing whether the respective semiconductor lasers 9 emit or not. The delay circuits 42 to 50 delay the dot signals D2 to D10, in order to align the respective beams along the subscanning direction Y. A delay method herein employed is now described.

Consider this method with reference to the semiconductor lasers 9 of the first line, i.e., those belonging to the line unit LU1. The line-to-line pitch between the second and first lines on photosensitive film 31 is equal to a distance obtained by multiplying the aforementioned third space e by magnification MAG. Assuming that a time corresponding to the distance l·MAG is defined as +, therefore, a driving time for the semiconductor lasers 9 belonging to the second line may be delayed by the time + with respect to a driving time for those belonging to the first line. Similar to the above, the pitch between the third and first lines is equal to twice the third space l, whereby an amount of delay in a driving time for the semiconductor lasers 9 belonging to the third line is equal to twice the time +. The amounts of delay for all semiconductor lasers 9 can be determined in accordance with this idea, so that the delay circuits 42 to 50 are structured in response thereto.

In the light source unit 10, as hereinabove described, an arrangement of the 80 semiconductor lasers 9 is implemented by a combination of the arrangement of beam locating pins 6 which are provided on the base block 5 and the plurality of stays 3 which are provided with the holes 7 having the first pitch D, whereby the stays 3 can be easily mounted on the base block 5 with no requirement for adjustment.

According to the present invention, it is possible to reduce the light source unit in size as compared with increase in number of light emitting devices. Namely, it is possible to suppress increase in size of a light source unit including light emitting means, m light emitting device groups, a base and m units. Consequently, it is possible to miniaturize means for reducing the beam-to-beam pitch of m by n optical beams, reflecting and imaging the reduced optical beams, typically corresponding to an optical instrument which is formed by the stereoprojective lens 12, the zoom lens 13, the mirrors M1, M2, the imaging lens 15 and the like, even if the number of the optical beams is increased. Further, according to the present invention, it is possible to easily assemble light emitting means, light emitting device groups and m line units with high accuracy and a high precision. In addition, according to the present invention, it is possible to align m by n optical beams, having a matrix-like arrangement shown in FIG. 1 and the like, in a subscanning direction (Y) on a recording medium.

While the invention has been shown and described in detail, the foregoing description is in all aspects illustrative and not restrictive. It is therefore understood that numerous modifications and variations can be devised without departing from the scope of the invention.

What is claimed is:

1. A multiple beam scanning apparatus comprising:

(a) a recording medium;

(b) means for generating m by n (m, n:) recording information signals, where m and n are each integers of at least 2;

(c) means for emitting m by n optical beams being independently modulated in response to said recording information signals respectively, said m by n optical beams being so arranged in a plane perpendicular to the travelling direction thereof that there are m optical beam groups, each including n optical beams spaced at intervals of a first space and arranged in a second direction that is perpendicular to a first direction said groups being arranged at regular intervals in said first direction and shifted at intervals of a second space with respect to said second direction, said first space corresponding to m time said second space;

(d) means for reducing a beam-to-beam pitch of said m by n optical beams being received from said means (c) and focusing reduced said m by n optical beams on said recording medium, said beam-to-beam pitch corresponding to a center distance between adjacent ones of said m by n optical beams; and (e) means for scanning said m by n optical beams, being imaged on said recording medium, in said first direction.

2. A multiple beam scanning apparatus in accordance with claim 1, wherein said (c) means includes:

(c-1) m by n light emitting device that are independently driven as a function of said recording information signals respectively, said m by n light emitting devices including m light emitting device groups, arranged at regular intervals in said first direction, each including n light emitting devices arranged in said second direction at intervals of said first space, adjacent ones of said light emitting device groups being shifted in said second direction at intervals of said second space.

3. A multiple beam scanning apparatus in accordance with claim 2, wherein said m light emitting device groups are arranged in said first direction at intervals of a third space, said third space being in proportion to said second space.

4. A multiple beam scanning apparatus in accordance with claim 3, wherein said third space corresponds to integral times said second space.

5. A multiple beam scanning apparatus in accordance with claim 4, wherein said (b) means comprises:

(b-1) means for generating said m by n recording information signals, and (b-2) means for delaying respective ones of said m by n recording information signals being generated by said means (b-1) so that said m by n optical beams being imaged on said recording medium are aligned in said second direction.

6. A multiple beam scanning apparatus in accordance with claim 5, wherein said (b-2) means includes:

(b-2-1) means for delaying said m by n recording information signals so that a delay time $D_i$ for n said recording information signals being applied to n said light emitting devices being included in an i-th (i: integer, $1 < i < m$) light emitting device group is as follows, assuming that the first one of said m light emitting device groups serves as a reference light emitting device group:

$$D_{i+} = (i-1) \cdot D_0$$

where $D_0$ represents a unit delay time being previously decided as a function of said third space.

7. A multiple beam scanning apparatus in accordance with claim 6, wherein said (d) means comprises:

(d-1) means for reflecting said m by n optical beams being emitted by said means (b), (d-2) a first lens system for reducing said beam-to-beam pitch between reflected said m by n optical beams, and (d-3) a second lens system for condensing said m by n optical beams, outgoing from said first lens system, on said recording medium.

8. A multiple beam scanning apparatus in accordance with claim 7, wherein said (e) means includes:

(e-1) a rotator for rotating a cylinder on which said recording medium mounts in said first direction.

9. A light source unit employed for recording information on the basis of optical beams being modulated in response to recording information signals, said light source unit comprising:

(a) a base; and (b) m (an: integer of at least 2) line units each having n (an: integer of at least 2) light emitting devices being arranged in a first direction at intervals of a first space, said first direction being parallel to the longitudinal direction of said line units, said m line units being arranged in parallel on said base at intervals of a third space in a second direction, being perpendicular to said first direction, and are successively shifted by intervals of a second space in said first direction, said first space being function of said second space.

10. A light source unit in accordance with claim 9, wherein said first space corresponds to said m times said second space, and said third space is in proportion to said second space.

11. A light source unit in accordance with claim 10, wherein respective ones of said m line units are formed by block bodies of the same shapes and the same dimensions.

12. A light source unit in accordance with claim 11, wherein said base has first and second end portions, each having m first and second locating means being arranged at said second space in a direction corresponding to said first direction and at said third space in a direction corresponding to said second direction, each of said block bodies includes a first portion, a second portion and a third portion being held between said first and second portions, said first and second portions each having first and second holes, said third portion being provided with said n light emitting devices, being aligned along said first direction at intervals of said first space from a position being separated from said first hole by a second distance, and said block bodies are located to said base by engaging said first and second hole with said first and second locating means, respectively.

13. A light source unit in accordance with claim 12, wherein said first and second end portions further have first and second tap portions respectively, and said first and second portions further have third and fourth holes through which first and second bolts screw up on said first and second tap portions respectively, thereby to fix block body to said base.

14. A light source unit in accordance with claim 13, wherein said third portion has n fifth holes being aligned with each other at intervals of said first space successively from a position being separated from said first hole by said second distance, and said light emitting devices are arranged in respective ones of said fifth holes.

15. A light source unit in accordance with claim 14, wherein said light emitting devices comprise semiconductor lasers, and collimator lenses for converting said optical beams emitted from said semiconductor lasers to collimated beams respectively.

16. A light source unit in accordance with claim 15, wherein said m line units comprise aperture means, provided on a major surface of said third portion for reducing spot diameters of said optical beams being transmitted through said collimator lenses, said aperture means having n apertures formed in position corresponding said fifth holes.

17. A light source unit in accordance with claim 16, wherein said base further has an opening portion, said opening portion being formed between said first and second ends, and all said n fifth holes are opposed to said opening portion in respective said block bodies.

18. A light source unit in accordance with claim 17, further comprising:

(c) a lens system for reducing a beam-to-beam pitch of said m by n optical beams passing through said aperture means to a prescribed pitch, said beam-to-beam pitch corresponding to a center distance between adjacent ones of said m by n optical beams.

19. A method of manufacturing a light source unit employed for recording information on the basis of optical beams being modulated in response to recording information signals, said method comprising:

a step (a) of preparing m line units each including a first portion, a second portion, and a third portion, being held between said first and second portions, said first and second portions having first and second mounting portions respectively;

a step (b) of mounting n light emitting devices on said third portion along a first direction at intervals of a first space in an aligned manner successively from a reference position;

a step (c) of preparing a base having first and second end portions each having m (m: integer of at least 2) first and second support portions being successively arranged at intervals of a second space in said first direction and a third space in a second direction, being perpendicular to said first direction, said second space corresponding to a value obtained by dividing said first space by said m, said third space being decided as a function of said second space; and a step (d) of engaging said first and second mounting portions of each said line unit with corresponding said first and second support portions, thereby fixing each said line unit to said base.

20. A method of manufacturing a light source unit in accordance with claim 19, wherein said step (a) includes:

a step (a-1) of preparing m block bodies of the same shapes and the same dimensions as said line units, each said block body having said first, second and third portions, and a step (a-2) of forming said first and second mounting portions on said first and second portions in each of prepared said m block bodies, and said step c includes:

a step (c-1) of preparing a base block body as said base, said base block body having said first and second end portions, a step (c-2) of forming said m first support portions on said first end portion, and a step (c-3) of forming said m second support portions on said second end portion.

21. A method of manufacturing a light source unit in accordance with claim 20, wherein said step (a-2) includes:

(a-2-1) a step of forming first and second holes in said first and second portions respectively, and (a-2-2) a step of forming n third holes in said third portion along said first direction at said first space successively from a position being separated from said one end by said second space, said third holes passing through a region being defined by a major surface of said third portion and a surface being opposite to said major surface, said step (b) includes:

a step (b-1) of mounting said n light emitting devices in said n holes respectively, said step (c-2) includes:

(c-2-1) a step of forming m first locating pins in said first end portion as those forming said m first support portions, said step (c-3) includes:

(c-3-1) a step of forming m second locating pins in said second end portion as those forming said m second support portions, and said step (d) includes, as to each said line unit:

a step (d-1) of inserting said first and second locating pins in said first and second holes respectively thereby locating said line unit, and a step (d-2) of fixing said line unit to said base after said location.

22. A method of manufacturing a light source unit in accordance with claim 21, wherein said step (a-2) further includes:

(a-2-3) a step of forming fourth and fifth holes in said first and second portions respectively, centers of said fourth and fifth holes being in positions separated from centers of said first and second holes in said first direction by a third distance, respectively, said step (c-2) further includes: (c-2-2) a step of forming m first tap portions on said first end portion as said first support portions, centers of said first tap portions being in positions separated from centers of said first locating pins by said third distance, said step (c-3) further includes: (c-3-2) a step of forming m second tap portions on said second end portion as said second support portions, centers of said second tap portions being in positions separated from centers of said second locating pins by said third distance, and said step (d-2) includes:

(d-2-1) a step of preparing said first and second bolts, and (d-2-2) a step of fitting said first and second bolts with said first and second tap portions through said fourth and fifth holes respectively.

23. A method of manufacturing a light source unit in accordance with claim 22, wherein said step (b) further includes:

a step (b-2) of preparing n collimator lenses, said collimator lenses bringing optical beams being emitted from said light emitting devices into parallel beams, a step (b-3) of successively mounting said n collimator lenses in said n third holes respectively, (b-4) a step of preparing aperture means having n sixth holes being arranged along said first direction at said first space, diameters of said sixth holes being smaller than those of said third holes, and (b-5) a step of fixing said aperture means on a major surface of said third portion while opposing said third and sixths holes to each other.

* * * * *

REEXAMINATION CERTIFICATE (3514th)

United States Patent [19]

Iwasa

[11] B1 5,477,259

[45] Certificate Issued May 12, 1998

[54] MULTIPLE BEAM SCANNING APPARATUS, LIGHT SOURCE UNIT, AND METHOD OF MANUFACTURING THE SAME

[75] Inventor: Hiroshi Iwasa, Kyoto, Japan

[73] Assignee: Dainippon Screen Mfg. Co., Ltd., Kyoto, Japan

Reexamination Request:
No. 90/004,481, Dec. 13, 1996

Reexamination Certificate for:
Patent No.: 5,477,259
Issued: Dec. 19, 1995
Appl. No.: 96,958
Filed: Jul. 26, 1993

[30] Foreign Application Priority Data

Jul. 29, 1992 [JP] Japan .................. 4-223403

[51] Int. Cl.$^6$ .................................................. B41J 2/45
[52] U.S. Cl. .................................. 347/238; 347/233
[58] Field of Search .................................. 347/237, 238, 347/247; 359/204, 310, 311, 312, 313

[56] References Cited

U.S. PATENT DOCUMENTS 3,816,659 6/1974 Landsman .................. 178/7.6
4,260,997 4/1981 Fukui .................. 346/108
4,638,370 1/1987 Rosier et al. .................. 358/293
4,743,091 5/1988 Gelbart .................. 350/252
4,819,018 4/1989 Moyroud et al. .................. 354/5

OTHER PUBLICATIONS

Webster's Seventh New Collegiate Dictionary, G & C. Merriam Company, 1976.

*Primary Examiner*—Mark Reinhart

[57] ABSTRACT

Disclosed herein is a light source unit for emitting multiple beams, which can be reduced in size. The light source unit (10) is formed by a base block (5) and ten stays (3). Ten locating pins (6) are provided on each side of the base block (5) at a second space (d) in a direction Y' and a third space (1) in a direction X'. Eight holes (7) are provided in each stay (3) at a first space (D), while holes (8) for locating pins (6) are provided on both ends thereof. A semiconductor laser is arranged in each hole (7). Each of the locating pins (6) is inserted into one individual one of the pin holes (8) and the ten stays (3) are then fixed to the base block (5) by through bolts (17). Thus, eight times ten semiconductor lasers are arranged on a two-dimensional plane of X'-Y' coordinates.

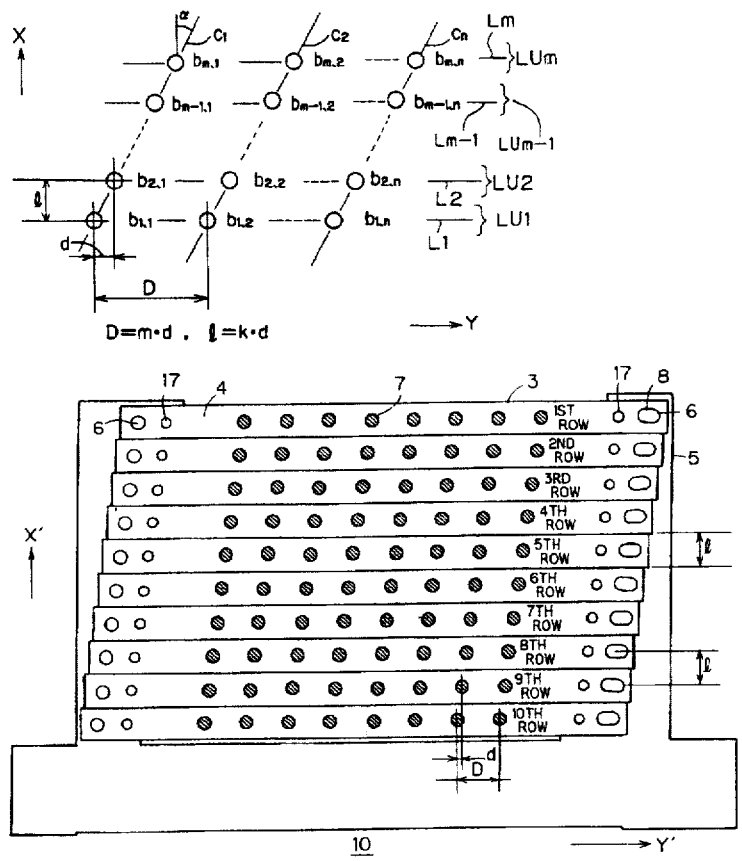

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 19–23 is confirmed.

Claims 3 and 4 are cancelled.

Claims 1, 2, 9 and 10 are determined to be patentable as amended.

Claims 5–8 and 11–18, dependent on an amended claim, are determined to be patentable.

1. A multiple beam scanning apparatus comprising:
   (a) a recording medium;
   (b) means for generating m by n (m, n:) recording information signals, where m and n are each integers of at least 2;
   (c) means for emitting m by n optical beams being independently modulated in response to said recording information signals respectively, said m by n optical beams being so arranged in a plane perpendicular to the travelling direction thereof that there are m optical beam groups, each including n optical beams spaced at intervals of a first space and arranged in a second direction that is perpendicular to a first direction said groups being arranged at [regular] intervals *of a third space* in said first direction and shifted at intervals of a second space with respect to said second direction, said first space corresponding to m time said second space, *said third space corresponding to integral times said second space*;
   (d) means for reducing a beam-to-beam pitch of said m by n optical beams being received from said means (c) and focusing reducing said m by n optical beams on said recording medium, said beam-to-beam pitch corresponding to a center distance between adjacent ones of said m by n optical beams; and
   (e) means for scanning said m by n optical beams, begin imaged on said recording medium, in said first direction.

2. A multiple beam scanning apparatus in accordance with claim 1, wherin said (c) means includes:
   (c-1) m by n light emitting device that are independently driven as a function of said recording information signals respectively, said m by n light emitting devices including m light emitting device groups, arranged at regular intervals in said first direction, each including n light emitting devices arranged in said second direction at intervals of said first space, adjacent ones of said light emitting device groups begin shifted in said second direction at intervals of said second space, *said m light emitting device groups being arranged in said first direction at intervals of said third space.*

9. A light source unit employed for recording information on the basis of optical beams being modulated in response to recording information signals, said light source unit comprising:
   (a) a base; and
   (b) m (an: integer of at least 2) line units each having n (an: integer of at least 2) light emitting devices begin arranged in a first direction at intervals of a first space, said first direction being parallel to the longitudinal direction of said line units, said m line units being [arranged] *separately provided* in parallel on *a flat surface of* said base at intervals of a third space in a second direction, being perpendicular to said first direction, and are successively shifted by intervals of a second space in said first direction, said first space being function of said second space.

10. A light source unit in accordance with claim 9, wherein said first space corresponds to said m times said second space, and said third space [is in proportion to] *corresponds to integral times* said second space.

* * * * *